United States Patent [19]

Miyamoto et al.

[11] Patent Number: 5,216,496
[45] Date of Patent: Jun. 1, 1993

[54] DIGITAL COLOR TELEVISION CAMERA APPARATUS FOR SELECTIVELY OUTPUTTING COMPONENT OR COMPOSITE PAL/NTSC SIGNALS

[75] Inventors: Kazuyoshi Miyamoto; Takashi Asaida, both of Kanagawa, Japan

[73] Assignee: Sony Corporation, Tokyo, Japan

[21] Appl. No.: 844,536

[22] Filed: Mar. 2, 1992

[30] Foreign Application Priority Data

Mar. 6, 1991 [JP] Japan .................. 3-063720
Mar. 6, 1991 [JP] Japan .................. 3-063721

[51] Int. Cl.$^5$ .................. H04N 9/04; H04N 11/20; H04N 9/79; H04N 11/04
[52] U.S. Cl. .................. 358/41; 358/11; 358/310; 358/13
[58] Field of Search .................. 358/11, 12, 41, 13, 358/23, 24, 30, 50, 51, 21 R, 327, 310, 340

[56] References Cited

U.S. PATENT DOCUMENTS

| 5,043,803 | 8/1991 | Asaida | 358/41 |
| 5,095,364 | 3/1992 | Asaida et al. | 358/41 |
| 5,140,408 | 8/1992 | Kaite et al. | 358/21 R |

FOREIGN PATENT DOCUMENTS 0311442 4/1989 European Pat. Off.

Primary Examiner—James J. Groody
Assistant Examiner—Safet Metjahic
Attorney, Agent, or Firm—William S. Frommer; Alvin Sinderbrand

[57] ABSTRACT

Digital color television camera apparatus including an encoder for selectively producing either a digital component video signal or a digital composite video signal in accordance with first or second television standards (e.g. NTSC or PAL) by encoding digital primary color image signals in a first mode to produce digital component video signals and in a second mode to produce digital composite video signals. The encoder includes a matrix for producing digital color difference signals at a clock rate equal to the digital sampling clock rate $2f_s$ and a down sampler for downsampling the digital color difference signals to reduce the clock rate. A digital low pass filter limits the frequency band of a down-sampled color difference signal by providing predetermined selected attenuation at preestablished frequencies of the down-sampled digital color difference signal. The encoder also includes a level setter for establishing predetermined quantizing values to represent respective reference signal levels of the digital component video signal when the encoder operates in its first mode, and for establishing different predetermined quantizing values to represent reference levels of the digital composite video signal when the encoder operates in its second mode.

29 Claims, 7 Drawing Sheets

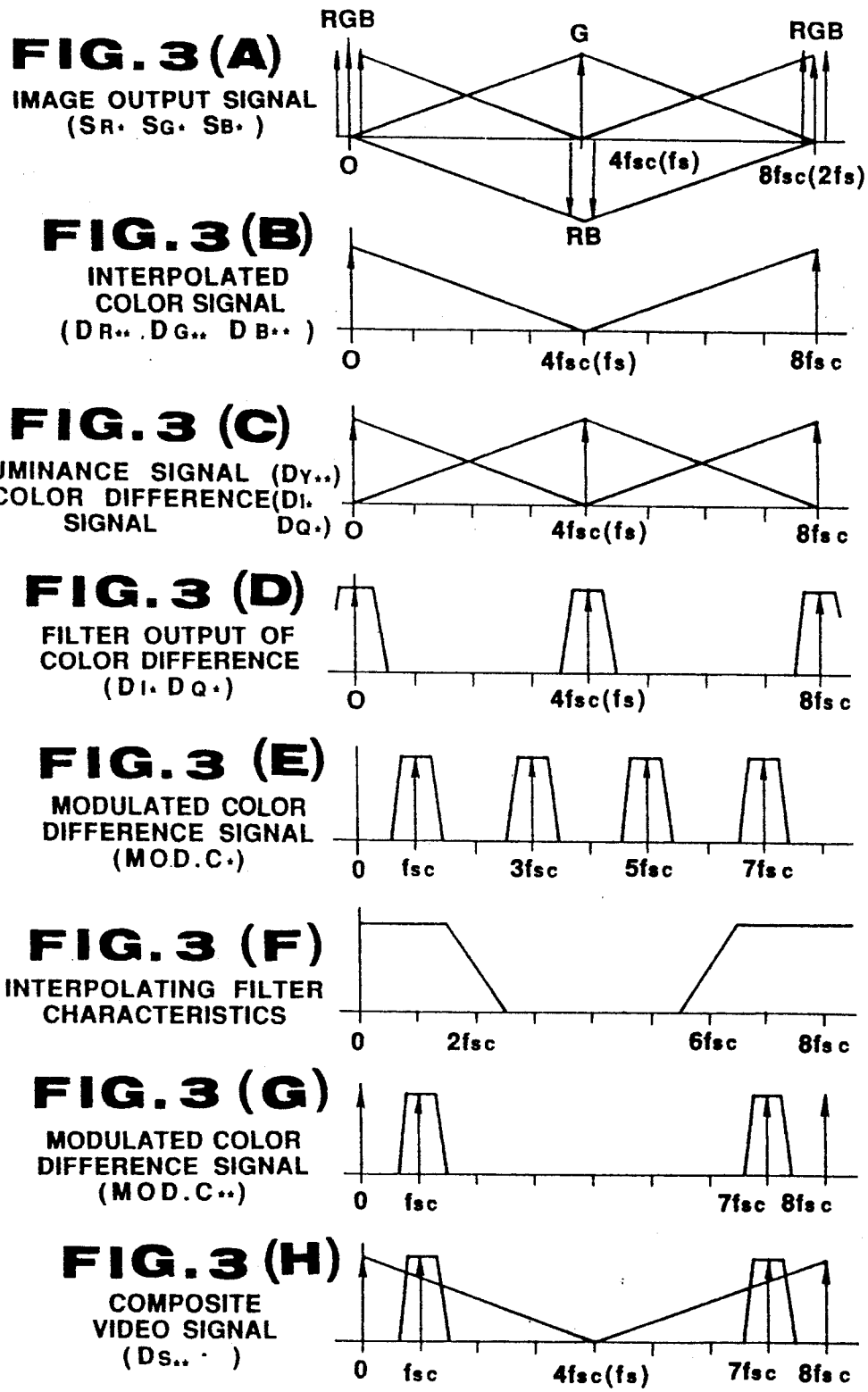

IMAGE OUTPUT SIGNAL
($S_R$, $S_G$, $S_B$)

INTERPOLATED
COLOR SIGNAL
($D_{R}$, $D_{G}$, $D_{B**}$)

LUMINANCE SIGNAL ($D_{Y**}$)
COLOR DIFFERENCE ($D_{V*}$
SIGNAL   $D_{U*}$)

FILTER OUTPUT OF
COLOR DIFFERENCE
($D_{V*}$, $D_{U*}$)

MODULATED COLOR
DIFFERENCE SIGNAL
(MOD.C.)

INTERPOLATING FILTER
CHARACTERISTICS

MODULATED COLOR
DIFFERENCE SIGNAL
(MOD.C..)

COMPOSITE
VIDEO SIGNAL
($D_{CS**}$)

DIGITAL COLOR TELEVISION CAMERA APPARATUS FOR SELECTIVELY OUTPUTTING COMPONENT OR COMPOSITE PAL/NTSC SIGNALS

BACKGROUND OF THE INVENTION

This invention relates to digital color television camera apparatus and, more particularly, to such apparatus which converts digital primary color image signals generated in accordance with any one of predetermined television standards, such as NTSC or PAL standards, into either a digital component video signal (such as a D-1 video signal) or a digital composite video signal (such as a D-2 video signal).

A typical color television camera includes an image pickup device which produces three primary color image video signals, such as red (R), green (G) and blue (B) signals. A luminance signal (Y) and color difference signals are generated from the R, G and B color video signals in accordance with a particular television standard with which the color video camera is used. Typically, the television standard is the NTSC standard, the PAL standard, the SECAM standard, or other conventional television standards that are used for broadcast purposes throughout the world. Usually, one television camera is used to generate color television signals in the NTSC standard, another is used to generate color television signals in the PAL standard, and so on.

In the NTSC standard, for example, the color difference signals which are generated from the primary color video signals are conventional I and Q color difference signals. In the PAL standard, the color difference signals which are generated from the primary color video signals are conventional U and V color difference signals. With reference to the NTSC standard, the relationship between the luminance signal Y and the color difference signals I and Q is as follows:

$Y = 0.30R + 0.59G + 0.11B$ $I = 0.60R - 0.28G - 0.32B$ $Q = 0.21R - 0.52G + 0.31B$

In the PAL standard, the relationship between the luminance signal Y and the color difference signals U and V is as follows:

$Y = 0.30R + 0.59G + 0.11B$ $U = B - Y$ $V = R - Y$

In the NTSC standard, the I color difference signal is constrained to a band of frequencies and exhibits a prescribed attenuation characteristic (referred to as a frequency band characteristic) such that the attenuation of the I signal at approximately 1.3 MHz is less than 2 dB and the attenuation of the I signal at approximately 3.5 MHz is greater than 20 dB.

The Q color difference signal of the NTSC standard exhibits a narrower bandwidth and a different frequency band characteristic. The attenuation of the Q signal at approximately 0.4 MHz is less than 2 dB, its attenuation at approximately 0.5 MHz is less than 6 dB and its attenuation at approximately 0.6 MHz is greater than 6 dB.

In the PAL standard, the frequency band characteristics of the U and V color difference signals are approximately the same and are constrained such that the attenuation thereof at approximately 1.3 MHz is less than 3 dB and its attenuation at approximately 4 MHz is greater than 20 dB.

In both the NTSC and PAL standards, the luminance signal Y and the color difference signals I and Q (for the NTSC standard) or U and V (for the PAL standard) are produced by combining the primary color video signals R, G and B in a matrix and then band-limiting the resultant color difference signals by means of a low pass filter whose filter characteristics conform to the aforementioned frequency band characteristics.

Typical color television cameras use conventional solid-state imaging systems in which a solid-state image sensor having a discrete pixel structure constituted by charge coupled devices (CCDs) is provided as the imaging section. The solid-state image sensor itself constitutes a sampling system for producing discrete samples of the color video signals R, G and B, which samples can be used to produce either analog or digital video signals. Because of this inherent sampling, aliasing components from the spatial sampling frequency $f_s$ which is used to sample the CCDs are mixed into the image pickup output signals produced by the solid-state image sensor in a predictable manner.

It has been proposed to use a dual type CCD solid-state image sensor for forming the 3-color image. In this dual type CCD sensor, one solid-state image sensor is used to produce the green color image and the other solid-state image sensor is provided with color coding light filters to produce the red and blue color images. It also has been proposed to use three separate CCD image sensors, one for each color. A so-called spatial offsetting technique for improving resolution in the latter arrangement (i.e. in the three CCD image sensor) is known. In this technique, the solid-state image sensor which produces the red color image is offset from the solid-state image sensor which produces the green image by an amount equal to one-half the spatial pixel sampling period; and, likewise, the solid-state image sensor which produces the blue image is offset from the green image sensor by this same one-half spatial pixel sampling period. By using this spatial offsetting technique, a multi-chip solid-state image sensor may be used to produce an analog output signal having high resolution that surpasses the restrictions inherent in the discrete number of pixels provided in the solid-state image sensor.

While a typical color television camera produces analog color video signals at its output, it is desirable to provide a camera whose output signals are in digital form. Such digital video signals should be compatible with the standardized digital recording formats currently in use, such as the so-called 4:2:2 digital component format (referred to by those of ordinary skill in the art as the D-1 format) or the digital composite format (referred to as the D-2 format). In the D-1 format, the luminance signal Y produced by, for example, the usual matrix, is sampled at a sampling frequency 13.5 MHz; and this sampling frequency is the same for both the NTSC standard and the PAL standard. In addition, the sampling frequency of the color difference signals is equal to 6.75 MHz (in both the NTSC and PAL standards). In the D-1 format, the sampled luminance and color difference signals are linearly quantized, and each sample is comprised of 8 bits. Heretofore, typically, the quantization levels of the luminance signal Y for the D-1 format in both the NTSC and PAL standards are such that the black level (0%) is assigned a quantization level of 16 and the white level (100%) is assigned the quantization level 235. In similar manner, the quantization levels of the color difference signals for both the NTSC and PAL standards are such that the quantization level 128 represents the no signal level and the quantization level 225 represents the maximum level, such as in response to a 100% color bar input.

In the D-2 format (which produces digital composite video signals), the luminance sampling frequency $f_s$ is equal to four times the chrominance subcarrier frequency $f_{sc}$ ($f_s = 4 f_{sc}$) for producing the digital composite video signal in both the NTSC and PAL standards. Of course, in the NTSC standard, $f_{sc} = 3.58$ MHz and in the PAL standard $f_{sc} = 4.43$ MHz. Thus, in the NTSC standard, the digitized video signals exhibit a clock frequency of 14.3 MHz and in the PAL standard, the digitized video signals exhibit a clock frequency of 17.7 MHz. In addition, other sampling and clock frequencies have been adopted for the D-2 format when digitizing color video signals in the PAL standard, namely a clock frequency equal to 908 times the horizontal scanning frequency $f_H$ ($f_s = 908 f_H$) or a clock frequency equal to 944 times the horizontal scanning frequency ($f_s = 944 f_H$) Thus, in the D-2 format, four different sampling clock frequencies have been used:
$f_s = 4 f_{sc} = 14.3$ MHz for NTSC;
$f_s = 4 f_{sc} = 17.7$ MHz for PAL;
$f_s = 908 f_H$ for PAL; and
$f_s = 944 f_H$ for PAL.

In the D-2 format, the video signal, including the synchronization and burst portions thereof, is linearly quantized; and each quantized sample is represented by 8 bits. In hexadecimal notation, the 8-bit quantization of the video signal for the black level (0%) is 3C and for the white level (100%) is C8. 8-bit quantization of the sync tip level in hexadecimal notation is 04.

One example of color television apparatus which produces digital video signals in accordance with the foregoing sampling clock frequencies and quantization levels is described in U.S. patent application Ser. No. 07/587,066, assigned to the assignee of the present invention.

Although it is desirable to provide a single color television camera capable of producing digital video signals in either the D-1 or D-2 formats for either the NTSC or PAL (or other) standards, certain difficulties in implementing a practical design are evident. For example, different sampling frequencies are used for the D-1 and D-2 formats, and even in the D-2 format, different sampling frequencies are used to digitize video signals in the PAL standard. Also, the quantizing values which are used to represent particular reference levels in the D-1 and D-2 formats, as well as in the NTSC and PAL standards, differ from each other, as mentioned above. Accordingly, it has been thought, heretofore, that different encoder circuits were needed to encode NTSC video signals in the D-1 format, to encode NTSC video signals in the D-2 format, to encode PAL video signals in the D-1 format and to encode PAL video signals in the D-2 format. It will be appreciated that if separate discrete encoder circuits are used to accommodate the D-1 and D-2 formats for encoding either NTSC or PAL video signals, a complex and expensive color television camera will result. Furthermore, since the frequency band characteristics of the color difference signals in the NTSC standard (for example, the I and Q signals) differ from the frequency band characteristics of the color difference signals in the PAL standard (for example, the U and V signals), the requisite band limiting operation which is used to minimize aliasing effects will require different low pass filter processing for the NTSC and PAL standards. Even when implemented by digital circuitry, such low pass filter processing is complex and expensive if different digital processing circuits must be used to band-limit the NTSC color difference signals and the PAL color difference signals.

Therefore, it had been thought to be complicated, expensive and, thus, impractical, to design a common color television camera that can be used to digitize both NTSC and PAL color video signals in both the D-1 and D-2 formats. Rather, at best, separate color television cameras were used, depending upon the digital format in which the digitized video signals are encoded and the particular television standard (e.g. NTSC or PAL) with which the digitized video signals are to be used.

OBJECTS OF THE INVENTION

Therefore, it is an object of the present invention to provide improved digital color television camera apparatus for producing digital video signals in different formats, such as digital component or digital composite video signals, in accordance with different television standards, such as NTSC or PAL standards.

Another object of this invention is to provide digital color television camera apparatus having a common encoder for producing either digital component or digital composite video signals in accordance with either NTSC or PAL (or other) standards.

A further object is to provide apparatus of the aforementioned type including level setting means to establish different quantizing values for representing different video signal reference levels in each of the operable digital formats (e.g. both digital component and digital composite video formats). For example, different quantizing values representing white and black levels as well as 0% and ±100% color levels are established by the level setting means.

An additional object of this invention is to provide apparatus of the aforementioned type which includes digital low pass filter processing circuitry of relatively simple construction to band-limit the digital color difference signals produced from the different television standards (e.g. NTSC or PAL).

Yet another object is to provide apparatus of the aforementioned type having a common digital low-pass filter to band-limit the color difference signal of a particular television standard (e.g. NTSC) even when the clock rate of that color difference signal differs from one digital format (e.g. a digital component video signal) to another (e.g. the digital composite video signal).

Various other objects, advantages and features of the present invention will become readily apparent from the following detailed description.

SUMMARY OF THE INVENTION

In accordance with this invention, digital color television camera apparatus is provided with a common encoder for encoding into a selected one of plural digital formats (e.g. the D-1 digital component video signal or the D-2 digital composite video signal) color television signals that are presented in any one of a plurality of different television standards (e.g. color video signals in the NTSC or PAL standards). The common encoder is operable in a first mode to encode digital primary color image signals (e.g. digitized R, G and B signals) to produce a digital component video signal (i.e. the D-1 format) and in a second mode to encode the digital primary color image signals to produce a digital composite video signal (i.e. the D-2 format). The encoder includes a level setting means for establishing predetermined quantizing values to represent respective reference signal levels of the digital component video signal (that is, particular quantizing values are assigned to video reference levels in the D-1 format) and to represent reference levels in the digital composite video signal (that is, different quantizing values are assigned to video reference levels in the D-2 format).

As another feature of this invention, the encoder includes a matrix which combines the digital primary color image signals that had been sampled at a clock rate $2f_s$ to produce color difference signals at that clock rate; and the color difference signals are down-sampled to reduce the clock rate thereof. The down-sampled color difference signals are filtered by a digital low pass filter which operates in accordance with a first television standard (e.g. NTSC) to band-limit the down-sampled color difference signals by providing selected attenuations at preestablished frequencies. The digital low pass filter operates in accordance with a second television standard (e.g. PAL) to band-limit the down-sampled color difference signals by providing different attenuations at different frequencies. By downsampling the color difference signal, and particularly the Q signal of the NTSC standard, the complexity of the digital low pass filter is significantly reduced. The digital low pass filter operates at different clock rates, depending upon whether the digital component or digital composite (e.g. D-1 or D-2) video signals are produced.

BRIEF DESCRIPTION OF THE DRAWINGS

The following detailed description, given by way of example, and not intended to limit the present invention solely thereto, will best be understood in conjunction with the accompanying drawings in which:

FIGS. 3A–3H are graphical representations of signal spectra which are useful in explaining the operation of the apparatus shown in FIG. I in accordance with the NTSC standard;

DETAILED DESCRIPTION OF A PREFERRED EMBODIMENT

Figure 1:
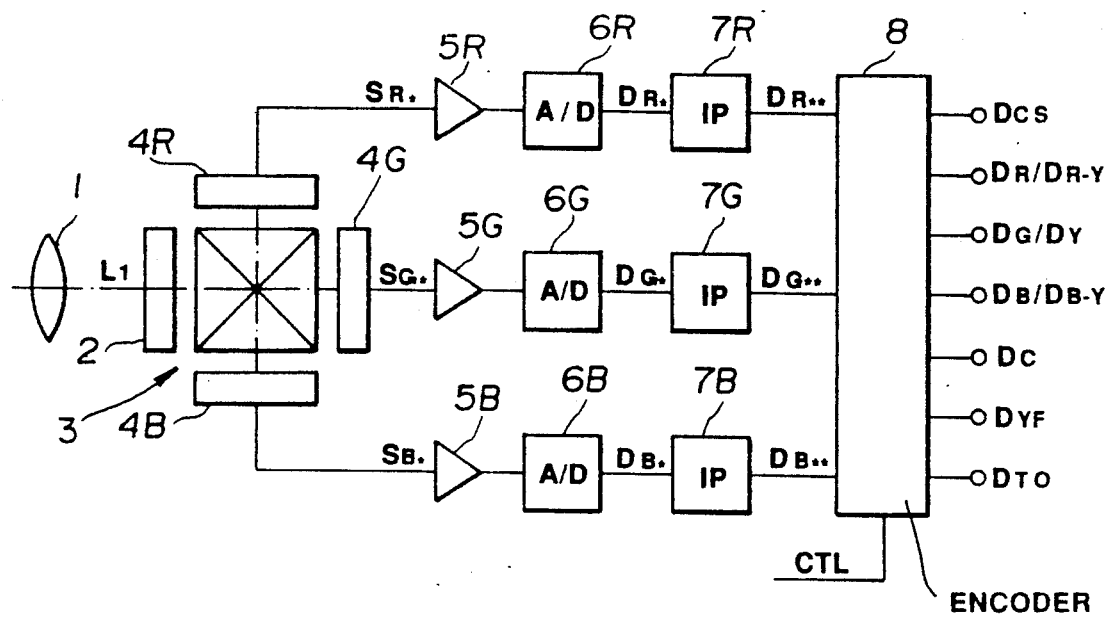
FIG. 1 is a block diagram of color television camera apparatus in which the present invention finds ready application.

Referring now to the drawings, and in particular to FIG. 1, there is illustrated a block diagram of a digital color television camera in which the present invention finds ready application. The color television camera has three solid-state image sensors in which imaging light $L_1$ incident from an imaging lens 1 via an optical low-pass filter 2 is separated by a color separating prism 3 into three primary color components for imaging three primary color images of an object on three CCD image sensors 4R, 4G and 4B. The individual color image signals produced by image sensors 4R, 4G and 4B constitute red, green and blue (R, G and B) color components from which color video signals may be produced in accordance with a desired television standard, such as NTSC or PAL.

Figure 2:
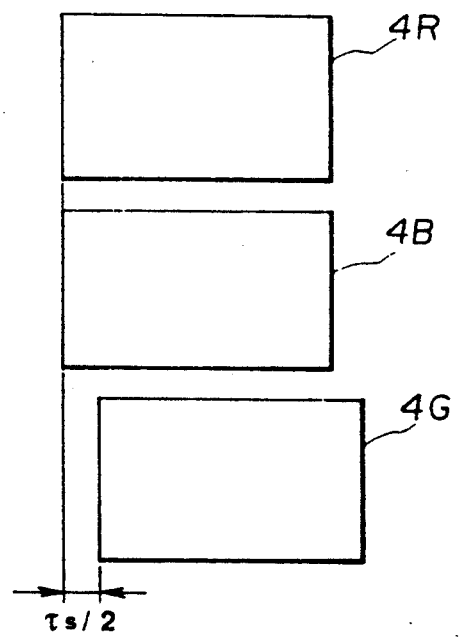
FIG. 2 is a diagrammatic view showing an array of solid-state image sensors used in the color television camera apparatus of FIG. 1.

In this embodiment, the CCD image sensors 4R, 4G and 4B constitute the imaging section of the color television camera and are so arrayed that the CCD image sensor 4R from which the red color component is produced is offset with respect to the CCD image sensor 4G from which the green color component is produced by one-half the spatial sampling period $\tau_s$ or $\frac{1}{2}\tau_s$, as shown in FIG. 2. Likewise, CCD image sensor 4B for producing the blue color component also is offset by $\frac{1}{2}\tau_s$ with respect to the green image sensor 4G. The three CCD image sensors 4R 4G and 4B are driven by a CCD driving circuit, not shown, so that the imaging charges of the pixels are read by read-out clock signals of a sampling frequency $f_s$ which is four times the color subcarrier frequency $f_{sc}$ ($f_s=4f_{sc}$).

The color television camera apparatus illustrated in FIG. 1 is adapted to operate in accordance With the NTSC or PAL standard to produce digital component color video signals in accordance with the D-1 format or to produce digital composite color video signals in accordance with the D-2 format. It will be appreciated that the illustrated television camera apparatus also may be operable in accordance with other conventional television standards, such as SECAM and the like. When operating in accordance with the NTSC standard to produce digital component video signals (i.e. the D-1 format), the imaging charges of the pixels produced by the respective CCD image sensors are read out at a sampling frequency $f_s=13.5$ MHz. When the image sensors are driven to produce R, G, B color components for producing digital composite video signals (i.e. the D-2 format), the image sensors are driven at a sampling frequency $f_s=4$ $f_{sc}=14.3$ MHz.

When the illustrated color television camera apparatus operates in accordance with the PAL standard, the CCD image sensors are driven at a read-out sampling clock frequency $f_s=13.5$ MHz when the R, G, B color components are digitized to produce digital component color video signals (i.e. the D-1 format). However, when the color components are digitized to produced digital composite color video signals (i.e. the D-2 format) in accordance with the PAL standard, the three image sensors are driven at the sampling clock frequency $f_s=4f_{sc}=17.7$ MHz. Consistent with other implementations of digitizing formats, such as the D-2 format, image sensors 4R, 4G and 4B may be driven with read-out clock signals at the sampling frequency $f_s=908\, f_H$ or $f_s=944\, f_H$, where $f_H$ is the horizontal scanning frequency of the PAL standard.

Figure 4A:
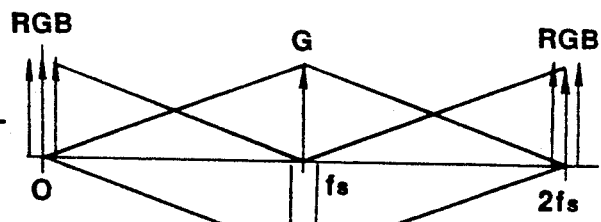
FIGS. 4A–4H are graphical representations of signal spectra which are useful in explaining the operation of the apparatus shown in FIG. 1 in accordance with the PAL standard.

When the CCD image sensors 4R, 4B and 4G are arranged to exhibit spatial offsetting as shown in FIG. 2, spatial samplings of the three primary color images derived from an object image are produced such that the red image is offset from the green image by $\tau_s/2$ and the blue image also is offset from the green image by $\tau_s/2$. Thus, when the green image is sampled at the sampling frequency $f_s$ to produce a sampled green image signal $S_{G^*}$, and the red and blue images are sampled at the sampling frequency $f_s$ to produce sampled red and blue image signals $S_{R^*}$ and $S_{B^*}$, the sampled green image signals are in anti-phase relative to the sampled red and blue image signals, such as shown in the spectra of the primary color image signals illustrated in FIG. 3A (which represents the NTSC standard) and in FIG. 4A (which represents the PAL standard). More particularly, FIG. 3A represents the spectra of the sampled R, G, B signals to be digitized in either the D-1 or D-2 format in accordance with the NTSC standard; and FIG. 4A likewise represents the spectra of the sampled R, G, B signals to be digitized in either the D-1 or D-2 format in accordance with the PAL standard.

The image pickup output signals $S_{R^*}$, $S_{G^*}$ and $S_{B^*}$, read out from CCD image sensors 4R, 4G and 4B by read out clock signals at the sampling frequency $f_s$, are coupled to analog/digital converters (ADCs) 6R, 6G and 6B via buffer amplifiers 5R, 5G and 5B, respectively. Although not shown, each of ADCs 6R, 6G and 6B is supplied from a timing generator with clock signals having the clock frequency (or repetition rate) $f_s$. Thus, each ADC is supplied with a clock signal whose frequency is equal to that of the read out sampling clock signals supplied to the respective CCD image sensors 4R, 4G and 4B. ADCs 6R, 6G and 6B directly digitize the sampled color pickup signals $S_{R^*}$, $S_{G^*}$ and $S_{B^*}$ at the clock rate $f_s$ to produce digital color signals $D_{R^*}$, $D_{G^*}$ and $D_{B^*}$, respectively, having output spectra which are the same as the spectra of the color image signals $S_{R^*}$, $S_{G^*}$ and $S_{B^*}$ shown in FIGS. 3A and 4A. Here, the A/D converters quantize the color image pickup signals linearly and produce 10-bit samples in which the 0% level is assigned the quantizing value 32 and the 100% level is assigned the quantizing level 856. Since the frequency of the clock signals supplied to the ADCs is equal to the frequency of the read-out clock signals supplied to the CCD image sensors 4R, 4G and 4B, the clock rate (or repetition rate) of the digital primary color image signals $D_{R^*}$, $D_{G^*}$ and $D_{B^*}$ is determined by the sampling clock frequency $f_s$, and thus is determined as a function of whether digital component or digital composite video signals are produced and whether those signals conform to the NTSC or PAL standard.

Figure 4B:
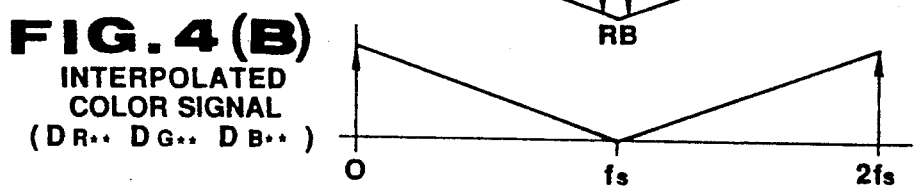
Figure 4C:
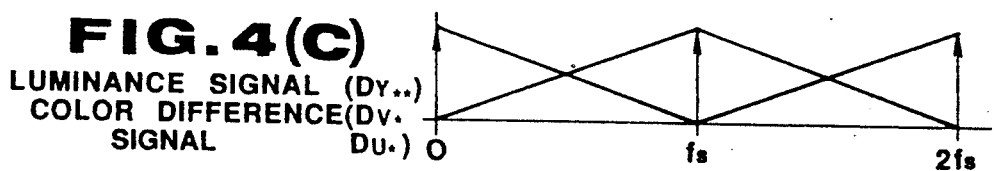

The digital primary color image signals $D_{R^*}$, $D_{G^*}$ and $D_{B^*}$ produced by ADCs 6R, 6G and 6B, are coupled to interpolating sections 7R, 7G and 7B, respectively. These interpolating sections are adapted to interpolate the digital primary color image signals which exhibit the clock rate $f_s$ to produce digital color signals $D_{R^{}}$, $D_{G^{}}$ and $D_{B^{**}}$ having the clock rate $2f_s$ (i.e. twice the clock rate $f_s$). It will be recognized that, in the present description, for convenience, a single asterisk (*) represents a clock rate $f_s$ and a double asterisk () represents the clock rate $2f_s$. The resultant digital color signals $D_{R^{}}$, $D_{G^{}}$ and $D_{B^{}}$ produced by interpolating sections 7R, 7G and 7B, respectively, exhibit the frequency spectrum shown in FIGS. 3B and 4B (in accordance with the NTSC and PAL standards, respectively).

It will be noted that the three primary color image signals $S_{R^*}$, $S_{G^*}$ and $S_{B^*}$ derived from CCD image sensors 4R, 4G and 4B cannot be arithmetically operated upon directly since the green color image signal $S_{G^*}$ is phase-offset by $\pi$ from both the red color image signal $S_{R^*}$ and the blue color image signal $S_{B^*}$, as described previously and as shown in FIG. 2. But, by increasing the clock rate of these color image signals in interpolating sections 7R, 7G and 7B, the digital color signals $D_{R^{}}$, $D_{G^{}}$ and $D_{B^{}}$ are converted into phase-matched digital color signals at the $2f_s$ rate. Now that these digital color signals are phase-matched, they may be digitally processed directly. As an alternative to this interpolation, the CCD image sensors may be provided with a number of pixels that is sufficiently large to assure high resolution without resorting to the spatial offsetting shown in FIG. 2. In that event, the primary color image signals $S_R$, $S_G$ and $S_B$ may be sampled at the $2f_s$ rate directly by ADCs 6R, 6G and 6B, resulting in phase-matched digital color signals $D_{R^{}}$, $D_{G^{}}$ and $D_{B^{}}$.

Figure 5:
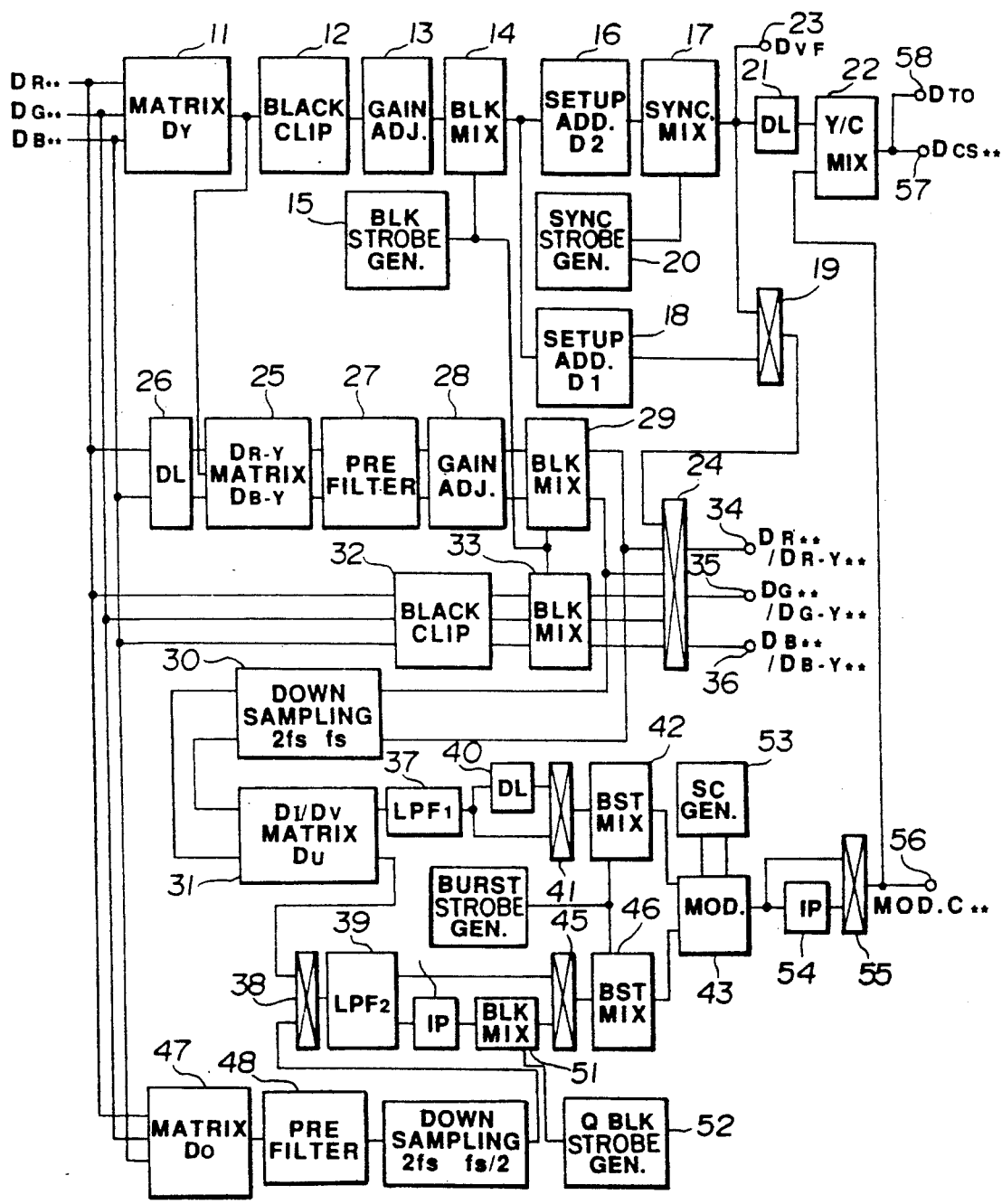
FIG. 5 is a block diagram of an encoder which incorporates the present invention.

The digital color signals $D_{R^{}}$, $D_{G^{}}$ and $D_{B^{}}$ produced by interpolating sections 7R, 7G and 7B at the $2f_s$ rate are supplied to an encoder B. This encoder is adapted to operate in different encoding modes to encode the digital color signals supplied thereto into either digital component video signals (e.g. the D-1 format) or digital composite video signals (e.g. the D-2 format) in accordance with either the NTSC or PAL standards (or other conventional television standards that may be preferred). The encoder is illustrated in FIG. 5 and includes a luminance section, a red and blue color difference section, and a color difference (I-Q, U-V) section. The luminance section includes a matrix 11 supplied with digital primary color image signals $D_{R^{}}$, $D_{G^{}}$ and $D_{B^{}}$ and is adapted to combine those signals to produce a digital luminance signal $D_{Y^{}}$. The digital luminance signal $D_{Y^{}}$ is supplied to the red and blue color difference section and also to a black level clipping circuit 12, the latter being adapted to clip the digital luminance signal to the black level. The clipped digital luminance signal then is supplied to a blanking mixer 14 by way of a level setting circuit 13, also referred to herein as a gain adjust circuit.

The level setting circuit, or gain adjuster 13, is adapted to establish and assign predetermined quantizing values to different reference levels included in the digital luminance signal $D_{Y^{}}$, depending upon whether the illustrated encoder is operating to produce digital component video signals (the D-1 format) or digital composite video signals (the D-2 format); and whether these digital video signals are consistent with the NTSC or PAL standard. For example, if the encoder operates to produce digital component video signals (the D-1 format), level setting circuit 13 operates to produce 8-bit samples of the digital luminance signal $D_{Y^{}}$, whether the digital luminance signal is intended to represent NTSC or PAL standards, and the quantizing value 235 is assigned to the white level (100%) while the quantizing value 16 is assigned to the black level (0%). However, if the encoder is operating to produce digital composite video signals (the D-2 format), then level setting circuit 13 produces 10-bit digital samples;

and if the digital composite video signal is produced in accordance with the NTSC standard, then the level setting circuit assigns the quantizing value 800 to the 100% level, the quantizing value 240 the 0% level and the quantizing value 16 to the sync tip level. However, if the digital composite video signal is produced by the encoder in accordance with the PAL standard, then level setting circuit 13 assigns the 10-bit quantizing value 816 to the 100% level, the quantizing value 256 to the 0% level and the quantizing value 16 to the sync tip level.

Blanking mixer 14 is supplied with blanking data generated by a blanking strobe generator 15 and mixes this blanking data with the digital luminance signal $D_{Y^{}}$ to whose reference levels predetermined quantizing values have been assigned by level setting circuit 13 as just described. The resultant digital luminance signal $D_{Y^{}}$ into which blanking data has been inserted by blanking mixer 14 is coupled to a synchronizing signal mixer 17 by a setup circuit 16, and this digital luminance signal also is supplied to a selector circuit 19 by way of another setup circuit 18. Setup circuit 16 is adapted to insert standardized setup data used in the D-2 format (forming no part of the present invention per se) into the blanking data that had been provided by blanking mixer 14. The resultant digital luminance signal $D_{Y^{**}}$, now represented in the D-2 format, has synchronizing data generated by sync strobe generator 20 inserted therein by synchronizing signal mixer 17.

The output of synchronizing signal mixer 17, namely, the digital luminance signal $D_{Y^{}}$ containing sync data, is coupled to another input of selector 19 and also to a luminance/chrominance (Y/C) mixer 22 by way of a delay circuit 21. This digital luminance signal $D_{Y^{}}$ also is coupled directly to an output terminal 23 which is used as a monitor output to supply luminance data $D_{YF}$ to a view finder of the camera. As will be described below, a modulated color signal MOD.C, having a clock frequency at the $2f_s$ rate, also is supplied to Y/C mixer 22 for mixing with the digital luminance signal $D_{Y^{}}$ to produce a digital composite video signal $D_{CS^{**}}$ which is supplied to an output terminal 57.

As mentioned above, and as shown in FIG. 5, the digital luminance signal $D_{Y^{**}}$ having blanking data inserted therein, is supplied from blanking mixer 14 to setup circuit 18. This setup circuit is adapted to insert into the blanking data now included in the digital luminance signal setup data that typically is used in accordance with the D-1 format. This setup data and the operation of setup circuit 18 form no part of the present invention per se.

Selector 19, which is coupled to synchronizing signal mixer 17 and to setup circuit 18 is adapted to operate in accordance with the D-1 format or the D-2 format to select either the digital luminance signal $D_{Y^{}}$ which includes the D-1 setup data provided by setup circuit 18 or the digital luminance signal $D_{Y^{}}$ which contains the D-2 setup data provided by setup circuit 16 plus the sync data provided by synchronizing signal mixer 17 to yet another selector 24. As will be described, selectors 19 and 24 (as well as the other selectors shown in FIG. 5) operate as selector switches and selector 24 provides at its output either digital primary color image signals $D_{R^{}}$, $D_{G^{}}$ and $D_{B^{}}$, supplied thereto through a black level clipping circuit 32 and a blanking mixer 33 (the latter being similar to blanking mixer 14 and being supplied with blanking data from blanking strobe generator 15), or red and blue color difference components $D_{R-Y^{}}$, $D_{B-Y^{}}$, supplied from the red and blue color difference section, plus the digital luminance signal $D_{Y^{}}$. The digital primary color signals provided by selector 24 may be supplied to nd used by other apparatus (not shown) for further processing or for conversion into analog signals, as may be desired. The digital color difference component and digital luminance signal provided at output terminals 34–36 of selector 24 comprise the digital component (D-1) video signals.

The red and blue color difference section includes a color difference matrix 25 supplied with the digital red and blue image signals $D_{R^{}}$ and $D_{B^{}}$ by way of a delay circuit 26. It will be appreciated that this delay circuit simply functions to compensate for delays inherent in the other circuitry included in the illustrated encoder. Matrix 25 also is supplied with the digital luminance signal $D_{Y^{}}$ produced by matrix 11. It will be appreciated that matrix 25 operates in conventional manner to produce the digital red and blue color difference components $D_{R-Y^{}}$ and $D_{B-Y^{}}$ from the digital red and blue components and the digital luminance signal supplied thereto. These digital color difference components $D_{R-Y^{}}$ and $D_{B-Y^{**}}$ are supplied to a blanking mixer 29 via a pre-filter 27 and a level setting circuit, or gain adjuster 28. When the encoder operates to produce digital component video signals (the D-1 format), level setting circuit 28 assigns a quantizing value to the 8-bit digital color difference components supplied thereto of 240 corresponding to a +100% level, a quantizing level 128 corresponding to the 0% level and a quantizing value 16 corresponding to the −100% level. Conversely, when the encoder operates to produce digital composite video signals (the D-2 format), the quantizing values assigned to the 10-bit samples of the digital color difference components supplied to level setting circuit 28 are, for the NTSC standard, a quantizing value of 800 corresponding to a 100% level, a quantizing value 240 corresponding to a 0% level and a quantizing value 16 corresponding to the sync tip level. However, if the digital composite video signals are encoded in accordance with the PAL standard, then the quantizing values assigned to the respective reference levels of the digital color difference components supplied to level setting circuit 28 are such that the 100% level is assigned the quantizing value 816, the 0% level is assigned the quantizing value 256 and the sync tip level is assigned the quantizing value 16.

The gain-adjusted color difference components provided at the output of level setting circuit 28 are supplied through a blanking mixer 29 to selector 24 as digital color difference components $D_{R-Y^{}}$ and $D_{B-Y^{}}$, respectively. Blanking mixer 29 inserts blanking data produced by blanking strobe generator 15 into the gain-adjusted color difference components provided by level setting circuit 28. These color difference components, including the blanking data, also are coupled to the color difference section of the encoder by way of a down sampling circuit 30.

The color difference section includes a matrix 31 adapted to produce color difference signals in accordance with either the NTSC standard or the PAL standard. When the encoder operates in accordance with the NTSC standard, the matrix generates the usual I color difference signal; and when the encoder operates in accordance with the PAL standard, the matrix generates the usual U and V color difference signals. As will be described, the color difference signals produced by matrix 31 subsequently are band-limited to reduce the bandwidth occupied by these digital color difference signals. To minimize the complexity and, thus, the hardware needed for such band-limiting processing, the clock rate of the color difference signals produced by matrix 31 is reduced from the $2f_s$ rate of the color difference components originally produced by matrix 25. This preferable reduction in clock rate is achieved by down sampling circuit 30, which is a conventional device and which is adapted, in the present embodiment, to convert the clock rate of the digital color components $D_{B-Y^{}}$ and $D_{R-Y^{}}$ from $2f_s$ to $f_s$. Thus, down sampling circuit 30 operates in conventional manner to supply to matrix 31 the down-sampled color difference components $D_{R-Y^*}$ and $D_{B-Y^*}$. Matrix 31 is provided with two outputs, and operates in accordance with the NTSC standard to produce, at its upper output (as illustrated in FIG. 5), the NTSC digital color difference signal $D_{I^*}$. When the encoder operates in accordance with the PAL standard, matrix 31 combines the color difference components $D_{R-Y^*}$ and $D_{B-Y^*}$ to produce PAL digital color difference signals $D_{U^*}$ and $D_{V^*}$; wherein the digital color difference signal $D_{U^*}$ is provided at the lower output of matrix 31 (as seen in FIG. 5) and the digital color difference signal $D_{V^*}$ is provided at the upper output of the matrix.

Band-limiting of the NTSC color difference signal $D_{I^*}$ or the PAL color difference signal $D_{V^*}$ is provided by a low pass filter 37. As will be described further below, the PAL color difference signal $D_{U^*}$ also is subjected to a band-limiting operation; but this is carried out by another low pass filter 39.

Figure 6:
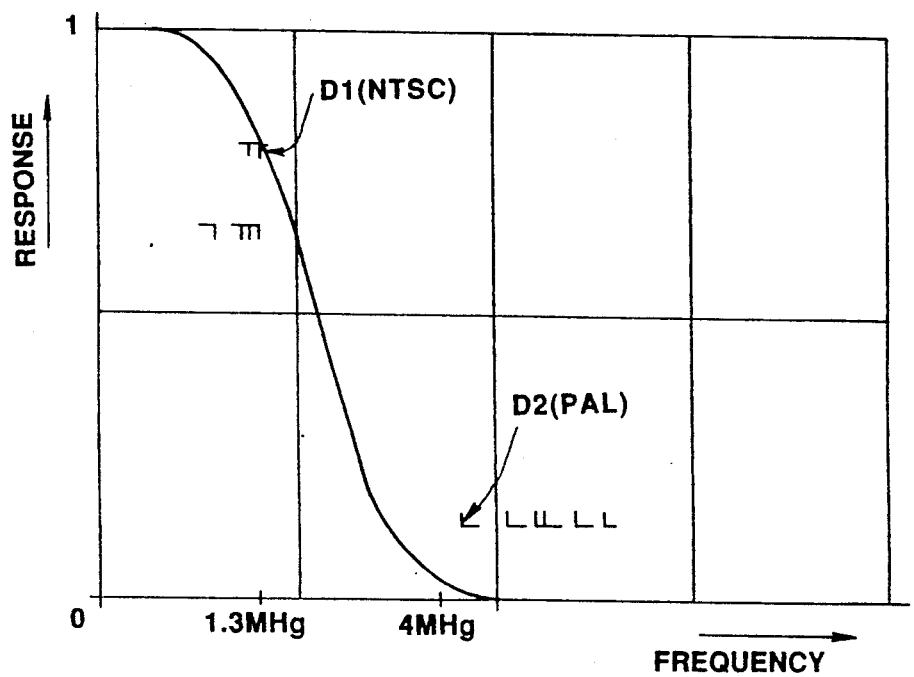
FIG. 6 illustrates a filter characteristic for band-limiting the NTSC color difference signal I and the PAL color difference signal V by common low pass filter 37 of FIG. 5.

The band-limiting processing of the digital color difference signal $D_{I^*}$ or $D_{V^*}$ is graphically illustrated in FIG. 6. In particular, low pass filter 37 exhibits a transfer characteristic to attenuate the NTSC digital color difference signal $D_{I^*}$ by less than 3 dB at approximately 1.3 MHz and to attenuate the PAL digital color difference signal $D_{V^*}$ by more than 20 dB at approximately 4 MHz. This band limiting processing thus reduces the effective band width of the color difference signals to a more useful, practical range for further transmission, recording or processing in either the D-1 or D-2 format.

The transfer characteristic exhibited by low pass filter 37 is as follows:

$$H_{37}(z) = \frac{1}{2^8} (z^{-2} + 2z^{-1} + 1)^2 (z^{-4} + 2z^{-2} + 1) \times \qquad 1$$
$$(-z^{-6} + 2z^{-4} + 2z^{-3} + 2z^{-2} - 1)$$

Figure 7:
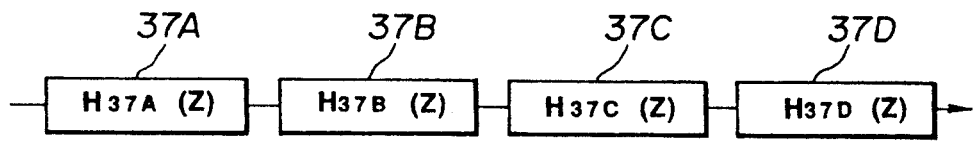
FIG. 7 is a block diagram of one implementation of low pass filter 37.

This transfer characteristic may be implemented by cascaded filter blocks 37A, 37B, 37C and 37D, as illustrated in FIG. 7. In particular, filter block 37A is adapted to process either the NTSC digital color difference signal $D_{I^*}$ or the PAL digital color difference signal $D_{V^*}$ in accordance with the following transfer function:

$$H_{37A}(z) = \frac{1}{2^2} (-z^{-6} + 2z^{-4} + 2z^{-3} + 2z^{-2} - 1) \qquad 2$$

The processed color difference signal provided by filter block 37A is further processed by filter block 37B, which exhibits the following transfer function:

$$H_{37B}(z) = \frac{1}{2^2} (z^{-4} + 2z^{-2} + 1) \qquad 3$$

The resultant digital color difference signal processed by filter block 37B is further processed by filter block 37C in accordance with the following transfer function:

$$H_{37C}(z) = \frac{1}{2^2} (z^{-2} + 2z^{-1} + 1) \qquad 4$$

Finally, filter block 37D provides further processing of the processed digital color difference signal supplied thereto by filter block 37C in accordance with the following transfer function:

$$H_{37D}(z) = \frac{1}{2^2} (z^{-2} + 2z^{-1} + 1) \qquad 5$$

The band-limited digital color difference signal $D_{I^*}$ or $D_{V^*}$ is selected by a selector 41, depending upon whether encoder 8 operates in accordance with the NTSC or PAL standard. The NTSC digital color difference signal $D_{I^*}$ is supplied to selector 41 by a delay circuit 40 which is adapted to compensate for inherent time delays imparted to the digital color difference signal $D_{Q^*}$, as will be described. Such additional time delays are not added to the digital color difference signal $D_{U^*}$ and, thus, the band-limited PAL digital color difference signal $D_{V^*}$ is supplied from low pass filter 37 to selector 41 directly.

Selector 41 is coupled to a modulator 43 via a burst mixer 42 to supply to the modulator either the band-limited NTSC color difference signal $D_{I^*}$ or the band-limited PAL color difference signal $D_{V^*}$. Burst mixer 42 is coupled to a burst strobe generator 44 and is adapted to insert burst data into the digital color difference signal supplied thereto from selector 41. It is appreciated that this inserted burst data is compatible with the NTSC standard when selector 41 supplies digital color difference signal $D_{I^*}$; and this burst data is compatible with the PAL standard when the selector supplies the color difference signal $D_{V^*}$.

Before describing the operation of modulator 43, reference now is made to the manner in which the NTSC digital color difference signal $D_Q$ is produced and processed, and the manner in which the PAL color difference signal $D_U$ is processed. The NTSC color difference signal $D_Q$ is produced by a matrix 47 which, as shown in FIG. 5, is adapted to combine the digital primary color image signals $D_{R^{}}$, $D_{G^{}}$ and $D_{B^{}}$, each exhibiting the clock rate $2f_s$, thus producing the digital color difference signal $D_{Q^{}}$, also at the clock rate $2f_s$. This digital color difference signal $D_{Q^{}}$ is adapted to be band limited and thus constricted to a relatively narrow bandwidth which, it will be appreciated, is sufficient for transmission, recording or further processing of the digital color difference signal $D_Q$, even when using the D-1 or D-2 format. Low pass filter 39, to be described, band-limits the digital color difference signal $D_Q$; and to reduce the complexity of this low pass filter, and thereby minimize the amount of hardware needed to implement it, the clock rate of the digital color difference signal $D_{Q^{}}$ is reduced from $2f_s$ to $f_s/2$ by a down sampling circuit 49. As shown, the digital color difference signal $D_{Q^{**}}$ is supplied from matrix 47 to down sampling circuit 49 by a pre-filter 48. The down sampling circuit is of conventional design and operates in a manner known to those of ordinary skill in the art. The resultant, down-sampled digital color difference signal $D_Q$ is coupled to low pass filter 39 by a selector 38. This selector is coupled to matrix 31 and is adapted to supply to low pass filter 39 either the down-sampled NTSC color difference signal $D_Q$ from down-sampling circuit 49 or the PAL color difference signal $D_{U^*}$ from matrix 31, depending upon whether the encoder is operating in accordance with the NTSC or PAL standard.

Figure 8:
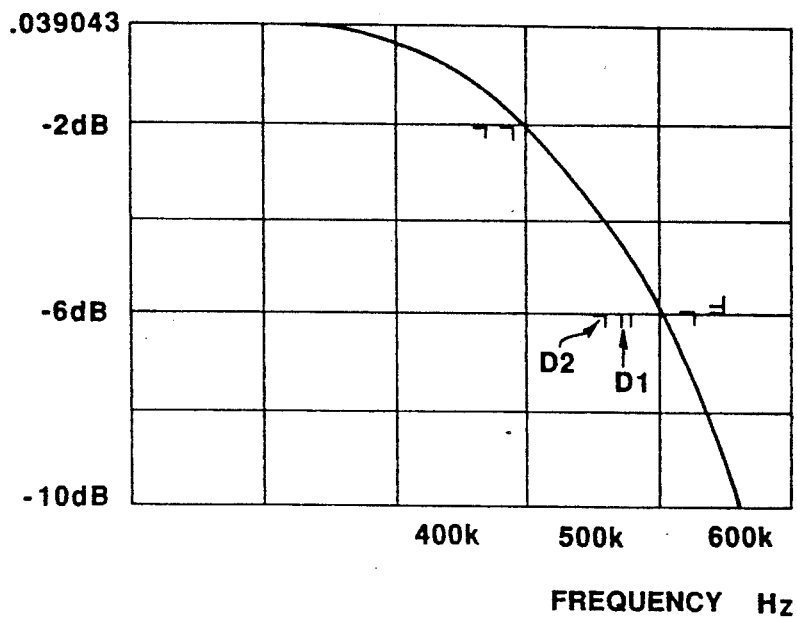
FIG. 8 illustrates a filter characteristic for band-limiting the NTSC color difference signal Q or PAL color difference signal U by common low pass filter 39 of FIG. 5.

Low pass filter 39 is adapted to band-limit the NTSC digital color difference signal $D_Q$ or the PAL color difference signal $D_{U^*}$ supplied thereto in accordance with the frequency characteristic graphically illustrated in FIG. 8. Thus, the low pass filter attenuates the NTSC color difference signal $D_Q$ by less than 2 dB for those components at approximately 0.4 MHz, by less than 6 dB for those components at approximately 0.5 MHz and by more than 6 dB for those components at approximately 0.5 MHz. It will be appreciated that the attenuation characteristics for the PAL color difference signal $D_{U^*}$ are approximately the same as the attenuation characteristics for the NTSC digital color difference signal $D_Q$, as represented by FIG. 8.

Figure 9:
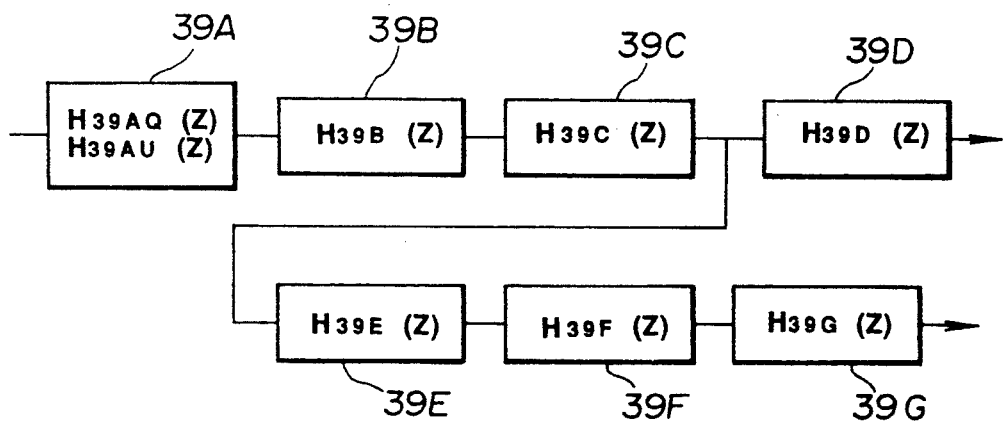
FIG. 9 is a block diagram of one implementation of low pass filter 39.

Low pass filter 39 may be implemented by the cascaded filter elements 39A-39G as illustrated in FIG. 9. In particular, filter elements 39A, 39B, 39C, 39E, 39F and 39G are used to produce the band-limited NTSC digital color difference signal $D_Q$; and cascaded filter elements 39A, 39B, 39C and 39D are used to produce the band-limited PAL color difference signal $D_{U^*}$. The initial, or input filter element 39A, which is described further below in conjunction with FIG. 10, exhibits two different transfer functions: $H_{39AQ}(z)$ when the NTSC digital color difference signal $D_Q$ is supplied thereto; and $H_{39AU}(z)$ when the PAL color difference signal $D_{U^*}$ is supplied thereto. Thus, depending upon which of the transfer functions of filter element 39A is selected, low pass filter 39 band-limits the color difference signal supplied thereto in accordance with one or the other of the following transfer functions:

$$H_{39Q}(z) = \frac{1}{2^{11}} (z^{-3} + 1)(z^{-1} + 1)(3z^{-4} + 2z^{-2} + 3)(z^{-2} + 2z^{-1} + 1) \times (z^{-4} + 2z^{-2} + 1)(-z^{-8} + 2z^{-5} + 2z^{-4} + 2z^{-3} - 1) \qquad 6$$

$$H_{39U}(z) = \frac{1}{2^8} (z^{-2} + 2z^{-1} + 1)^2(z^{-4} + 2z^{-2} + 1) \times (-z^{-6} + 2z^{-4} + 2z^{-3} + 2z^{-2} - 1) \qquad 7$$

Assuming that selector 38 supplies the NTSC color difference signal $D_Q$ to low pass filter 39, filter element 39A is operated, as will be discussed below in conjunction with FIG. 10, to process the color difference signal in accordance with the following transfer function:

$$H_{39AQ}(z) = \frac{1}{2^2} (-z^{-8} + 2z^{-5} + 2Z^{-4} + 2z^{-3} - 1) \qquad 8$$

Alternatively, if selector 38 supplies the PAL color difference signal $D_{U^*}$ to filter 39, filter element 39A processes the color difference signal in accordance with the following transfer characteristic:

$$H_{39AU}(z) = \frac{1}{2^2} (-z^{-6} + 2z^{-4} + 2Z^{-3} + 2z^{-2} - 1) \qquad 9$$

The color difference signal processed by filter element 39A is supplied to filter element 39B which processes this digital color difference signal in accordance with the following transfer function:

$$H_{39B}(z) = \frac{1}{2^2} (z^{-4} + 2z^{-2} + 1) \qquad 10$$

The processed digital color difference signal produced by filter element 39B is coupled to filter element 39C which provides further processing of the digital color difference signal in accordance with the following transfer function:

$$H_{39C}(z) = \frac{1}{2^2} (z^{-2} + 2z^{-1} + 1) \qquad 11$$

The further processed digital color difference signal produced by filter element 39C is supplied to filter element 39D which operates in accordance with the following transfer function:

$$H_{39D}(z) = \frac{1}{2^2} (z^{-2} + 2z^{-1} + 1) \qquad 12$$

As mentioned above, the digital color difference signal processed by filter element 39D constitutes the band-limited PAL color difference signal $D_{U^*}$; and this band-limited color difference signal is provided at the output of low pass filter 39 and, as shown in FIG. 5, is selectively coupled to modulator 43 via a burst mixer 46 by a selector 45.

The digital color difference signal processed by filter element 39C also is supplied to filter element 39E as shown in FIG. 9. This filter element 39E processes the color difference signal supplied thereto in accordance with the following transfer function:

$$H_{39E}(z) = \frac{1}{2^3} (3z^{-4} + 2z^{-2} + 3) \qquad 13$$

The further processed digital color difference signal produced by filter element 39E is coupled to filter element 39F which provides further processing thereof in accordance with the following transfer function:

$$H_{39F}(z) = \frac{1}{2} (z^{-1} + 1) \qquad 14$$

Finally, the digital color difference signal processed by filter element 39F is supplied for further processing by filter element 39G in accordance with the following transfer function:

$$H_{39G}(z) = \frac{1}{2} (z^{-3} + 1) \qquad 15$$

The output of filter element 39G constitutes the band-limited NTSC color difference signal $D_Q$. This band-limited color difference signal $D_Q$ is subjected to a clock rate increase by an interpolator 50, as will be described, and thereafter is selectively coupled to modulator 43 via burst mixer 46 by way of selector 45.

Figure 10:
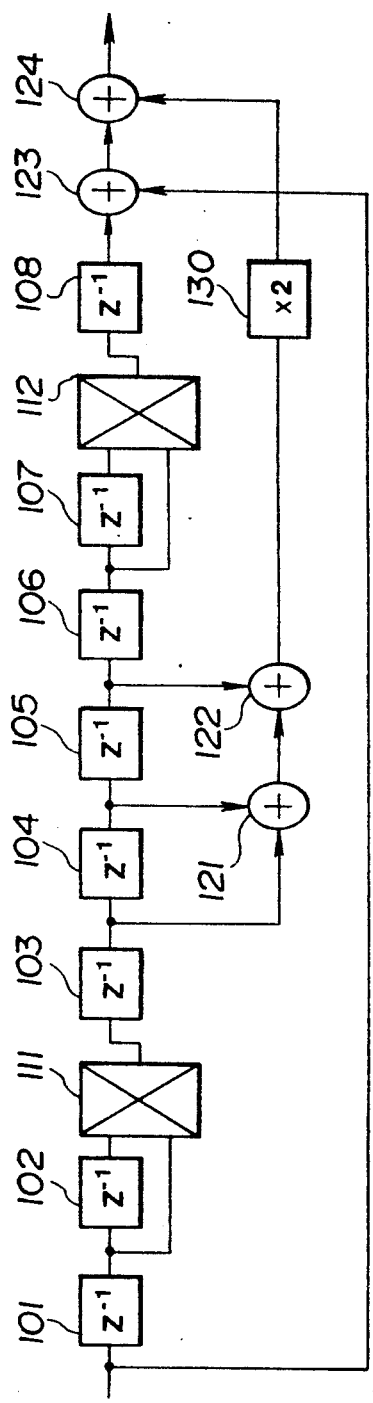
FIG. 10 is a block diagram representing the first stage 39A of the low pass filter implementation shown in FIG. 9.

One embodiment of filter element 39A, which is selectively adapted to exhibit the transfer function represented by equation (8) or by equation (9), is illustrated in the block diagram of FIG. 10. In this block diagram, it will be recognized that each block identified as $z^{-1}$ is a delay circuit adapted to delay the digital color difference signal supplied thereto by one sampling period. It will also be appreciated that the sampling period varies as a function of whether the encoder operates in accordance with the NTSC or PAL standard and, furthermore, whether the encoder produces digital component video signals in the D-1 format or digital composite video signals in the D-2 format. It will be recalled that the sampling frequency $f_s$ which, of course, determines the duration of the sampling period, is selectable in accordance with the following table:

| STANDARD | FORMAT | $f_s$ |
|---|---|---|
| NTSC | D-1 | 13.5 MHz |
| NTSC | D-2 | 14.3 MHz |
| PAL | D-1 | 13.5 MHz |
| PAL | D-2 | 17.7 MHz |
| PAL | — | 908 $f_H$ |
| PAL | — | 944 $f_H$ |

Consistent with the foregoing, the delay imparted by each delay circuit preferably is adjustable and selectable as a function of whether the encoder operates in accordance with the NTSC or PAL standard and, furthermore operates to produce digital component or digital composite video signals (i.e. either in the D-1 or D-2 format). It will be appreciated, therefore, that each delay circuit may be implemented by a simple programmable divider supplied with a reference high frequency clock signal that is frequency-divided by the factor N, where N is selectable to produce the value of the clock frequency $f_s$ set out in the foregoing table.

As shown in FIG. 10, filter element 39A is comprised of eight delay circuits 101–108 connected in cascade. To implement the transfer function represented by equation (8) above, all eight of these delay circuits are used. However, to implement the transfer function represented by equation (9), delay circuits 102 and 107 are bypassed. A selector 111 is operated to selectively bypass delay circuit 102 and a selector 112 is operated to selectively bypass delay circuit 107. It will be appreciated, therefore, that when low pass filter 39 is supplied with the NTSC digital color difference signal $D_Q$, selector 111 couples delay circuit 102 to delay circuit 103 and selector 112 couples delay circuit 107 to delay circuit 108. However, when the low pass filter is supplied with the PAL color difference signal $D_{U^*}$, selector 111 bypasses delay circuit 102 and couples delay circuit 101 directly to delay circuit 103; and selector 112 bypasses delay circuit 107 and couples delay circuit 106 directly to delay circuit 108.

Filter element 39A, as shown in FIG. 10, also includes an adder 121 for summing the outputs of delay circuits 103 and 104 and an adder 122 for summing the output of delay circuit 105 to the summed outputs provided by adder 121. It will be appreciated that, alternatively, a single adder may be used to sum the outputs of delay circuits 103, 104 and 105.

Another adder 123 is coupled to the output of delay circuit 108 and sums this output With the digital color difference signal supplied to the input of filter element 39A. The summed output provided by adder 123 is subtracted from the summed output of adder 122, the latter having its value doubled, or multiplied by the coefficient "2", by a coefficient multiplier 130. The implementation shown in FIG. 10 thus operates to provide the transfer function represented by equation (8) when the NTSC digital color difference signal $D_Q$ is supplied to low pass filter 39G by selector 38; and to provide the transfer function represented by equation (9) when the PAL digital color difference signal $D_{U^*}$ is supplied thereto.

It is seen that, by supplying a down-sampled digital color difference signal $D_Q$ to low pass filter 39, rather than the color difference signal $D_{Q^{**}}$ having the clock rate $2f_s$, the complexity and, thus, the hardware needed to band-limit the color difference signal in accordance with the frequency characteristic illustrated in FIG. 8 is substantially reduced.

Interpolator 50 is coupled to low pass filter 39 to receive the band-limited NTSC digital color difference signal $D_Q$. For example, the interpolator is coupled to the output of filter element 39G, shown in FIG. 9. Interpolator 50 may be of conventional construction and operates in a manner known to those of ordinary skill in the art to increase the clock rate of the band-limited color difference signal $D_Q$ supplied thereto. The resultant band-limited digital color difference signal exhibits the clock rate $f_s$; and this digital color difference signal $D_{Q^*}$ is coupled to a blanking mixer 51 which is supplied with blanking data from a blanking strobe generator 52 and operates to insert this blanking data into the interpolated, band-limited digital color difference signal $D_{Q^*}$. Selector 45 is coupled directly to low pass filter 39 and to the output of blanking mixer 51 and is adapted to select either the band-limited digital color difference signal $D_{Q^*}$ into which blanking data has been inserted, or the band-limited color difference signal $D_{U^*}$, for application to burst mixer 46. Here, the burst mixer is similar to aforementioned burst mixer 42 and is supplied with burst data from burst strobe generator 44 for insertion into the selectively supplied band-limited NTSC digital color difference signal $D_Q$ or band-limited PAL digital color difference signal $D_{U^*}$. As shown in FIG. 5, the output of burst mixer 46 is coupled to modulator 43.

Figure 4D:
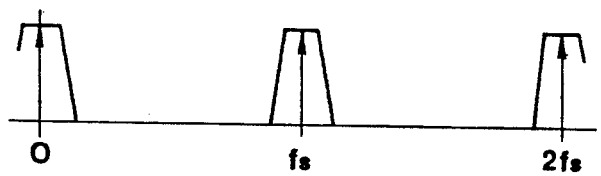
Figure 4E:
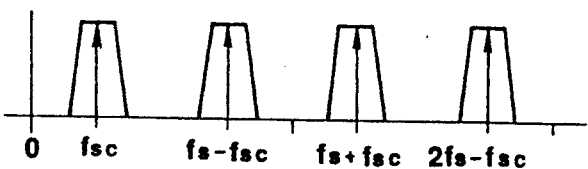

It will be appreciated, therefore, that when the illustrated encoder operates in accordance with the NTSC standard, modulator 43 is supplied with digital color difference signals $D_{I^*}$ and $D_{Q^*}$ by burst mixers 42 and 46, these color difference signals having been band-limited by low pass filters 37 and 39, respectively. However, when the encoder operates in accordance with the PAL standard, modulator 43 is supplied with band-limited digital color difference signals $D_{V^*}$ and $D_{U^*}$ from low pass filters 37 and 39, respectively, by way of burst mixers 42 and 46. The modulator performs a modulating operation in which a color subcarrier supplied thereto by a color subcarrier generator 53 is subjected to orthogonal biaxial modulation by the color difference signals $D_{I^*}$ and $D_{Q^*}$ or the by the color difference signals $D_{U^*}$ and $D_{V^*}$. FIG. 3D illustrates the signal spectrum of the NTSC digital color difference signals $D_{I^*}$ and $D_{Q^*}$; and FIG. 4D illustrates the signal spectrum of the PAL color difference signals $D_{V^*}$ and $D_{U^*}$. Modulator 43 produces modulated color difference signals MOD.C* at the $f_s$ clock rate, and these modulated color difference signals in the NTSC standard exhibit a frequency distribution containing odd harmonics of the color subcarrier frequency $f_{sc}$ as shown in FIG. 3E. The modulated color difference signals MOD.C* in the PAL standard exhibit the frequency distribution shown in FIG. 4E containing difference frequency components $f_s - f_{sc}$ and $2f_s - f_{sc}$, and sum frequency components $f_s + f_{sc}$.

Figure 4F:

The modulated color difference signals MOD.C* contain the $3f_{sc}$ frequency component (FIG. 3E) or the $f_s - f_{sc}$ frequency component (FIG. 4E) which will adversely affect the composite video signals when the encoder operates in accordance with the D-2 format. To avoid this, a rate converter 54 is coupled to modulator 43 to process the modulated color difference signal MOD.C* by digital filtering with the filtering characteristics shown in FIGS. 3F and 4F to extract the frequency components $f_{sc}$ and $7f_{sc}$ when NTSC color difference signals are supplied thereto; and to extract the frequency components $f_{sc}$ and $2f_s - f_{sc}$ when PAL color difference signals are supplied thereto.

Figure 4G:
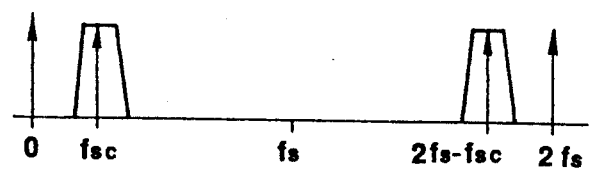
Figure 4H:
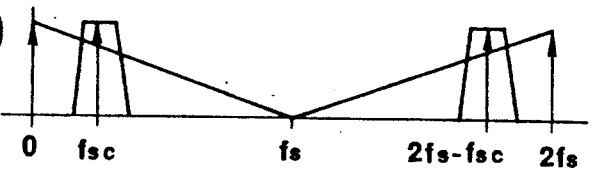

The resultant operation performed on the modulated color difference signals MOD.C* by rate converter 54 results in modulated color difference signals MOD.C** as shown in FIGS. 3G or 4G, depending again on whether NTSC or PAL color difference signals are supplied to modulator 43. The filter characteristics exhibited by the digital filter included in rate converter 54 pass the color subcarrier frequency component $f_{sc}$ and block the frequency components $3f_{sc}$ and $f_s - f_{sc}$.

A further selector 55 is coupled directly to the output of modulator 43 and also to the output of rate converter 54 and is adapted to supply to an output terminal 56 the modulated color difference signal MOD.C in either the NTSC or PAL standard. The output of selector 55 also is coupled to Y/C mixer 22 for combining the modulated color difference signals MOD.C with the digital luminance signal $D_{Y}$. It is appreciated, therefore, that delay circuit 21, through which the digital luminance signal $D_{Y}$ is supplied to Y/C mixer 22, compensates (or matches) the inherent time delays exhibited by the color difference section of the encoder shown in FIG. 5. As a result, Y/C mixer 22 produces a digital composite video signal $D_{CS**}$ at the $2f_s$ clock rate; and this digital composite video signal is coupled to output terminal 57 for use in recording, transmission or other processing in the D-2 format.

While the present invention has been particularly shown and described in conjunction with preferred embodiments, it will be readily appreciated by those of ordinary skill in the art that various changes and modifications may be made without departing from the spirit and scope of the invention. From the foregoing, it is seen that a common encoder is provided to encode digital color television signals in either the NTSC or PAL standard to produce digital component or digital composite video signals in either the D-1 or D-2 format. Band-limiting of NTSC and PAL color difference signals is attained by a common low pass filter; and by reducing the clock rate of the digital color difference signals supplied to the low pass filter, as by down sampling the NTSC Q signal, the complexity and requisite hardware to implement the band-limiting processing is significantly reduced. Additionally, relatively simple level setting, or gain adjusting, circuits are provided to assign desired quantizing values to particular reference levels of the digital component or digital composite video signals (i.e. reference levels in the D-1 or D-2 format), whether the video signals are consistent with NTSC or PAL (or any other conventional) television standard.

Therefore, it is intended that the appended claims be interpreted as including the specific embodiments described herein, alternatives which have been mentioned above and all equivalents thereto.

What is claimed is:

1. Digital color television camera apparatus for selectively producing either a digital component video signal or a digital composite video signal, comprising: image means for providing digital primary color image signals; encoding means coupled to receive said digital primary color image signals and operable in a first mode to encode said digital primary color image signals to produce a digital component video signal, and in a second mode to encode said digital primary color image signals to produce a digital composite video signal; and level setting means included in said encoding means and operable when said encoding means operates in said first mode for establishing predetermined quantizing values to represent respective reference levels of said digital component video signal, said level setting means being operable when said encoding means operates in said second mode for establishing different predetermined quantizing values to represent respective reference levels of said digital composite video signal.

2. The apparatus of claim 1, wherein said digital component video signal includes luminance and color difference components, and said respective reference levels correspond to 0% and 100% of the luminance component and to 0% and ±100% of the color difference components.

3. The apparatus of claim 1, wherein said digital composite video signal includes luminance and synchronizing signals, and said respective reference levels correspond to 0% and 100% of the luminance signal and to a sync tip level of the synchronizing signal.

4. The apparatus of claim 1 wherein said level setting means establishes 8-bit quantizing values to represent samples of the digital component video signal.

5. The apparatus of claim 1 wherein said level setting means establishes 10-bit quantizing values to represent samples of the digital composite video signal.

6. The apparatus of claim 1 wherein the digital component and digital composite video signals produced by said encoding means represent NTSC video signals.

7. The apparatus of claim 1 wherein the digital component and digital composite video signals produced by said encoding means represent PAL video signals.

8. The apparatus of claim 1 wherein said encoding means operates in accordance with a first television standard to selectively encode NTSC video signals as digital component or digital composite video signals, and in accordance with a second television standard to selectively encode PAL video signals as digital component or digital composite video signals; and wherein the quantized values which represent reference levels of NTSC digital composite video signals differ from the quantized value which represent reference levels of PAL digital composite video signals.

9. The apparatus of claim 8 wherein the quantized values which represent reference levels of NTSC digital component video signals are substantially equal to the quantized values which represent reference levels of PAL digital component video signals.

10. Digital color television camera apparatus for selectively producing either a digital component video signal or a digital composite video signal in accordance with either a first or a second television standard, comprising: image means for providing digital primary color image signals at a predetermined sampling clock rate $2f_s$ from which said digital component or digital composite video signal is derived; matrix means coupled to receive said digital primary color image signals at said sampling clock rate for producing color difference signals therefrom at said sampling clock rate; down sampling means coupled to said matrix means for down sampling at least one of the color difference signals to reduce the sampling clock rate thereof; and digital low pass filtering means operable in accordance with said first television standard to limit the frequency band of the down-sampled color difference signal by providing predetermined selected attenuation at pre-established frequencies of the down- sampled color difference signal, said digital low pass filtering means being operable in accordance with said second television standard to limit the frequency band of the down-sampled color difference signal by providing predetermined selected attenuation at different pre-established frequencies of the down-sampled color difference signal, thereby producing a band-limited color difference signal for said digital composite video signal.

11. The apparatus of claim 10 further comprising interpolating means coupled to said digital low pass filtering means for increasing the clock rate of at least the band-limited, down-sampled color difference signal when said digital low pass filtering means operates in accordance with said first television standard.

12. The apparatus of claim 11 further comprising modulating means for modulating a subcarrier with the increased clock rate color difference signal produced by said interpolating means when said digital low pass filtering means operates in accordance with said first television standard, and for modulating a subcarrier with the band-limited down-sampled color difference signal produced by said digital low pass filtering means when said low pass filtering means operates in accordance with said second television standard, the modulated subcarrier being included in said digital composite video signal.

13. The apparatus of claim 12, wherein said matrix means comprises a first matrix for producing a digital color difference signal $D_Q$ in accordance with said first television standard; and wherein said downsampling means comprises a first downsampler for downsampling said color difference signal $D_Q$ to reduce the sampling clock rate thereof to $f_s/2$.

14. The apparatus of claim 13 wherein said interpolating means increases the clock rate of the band-limited digital color difference signal $D_Q$ produced in accordance with said first television standard to a clock rate $f_s$.

15. The apparatus of claim 13 wherein said matrix means further comprises second and third matrices for respectively producing digital red and blue color difference components from said digital primary color image signals and for producing a digital color difference signal $D_U$ from said digital red and blue color difference components in accordance with said second television standard; and wherein said downsampling means further comprises a second downsampler for downsampling said digital red and blue color difference components to a clock rate $f_s$ and supplying the down-sampled digital red and blue color difference components to said third matrix.

16. The apparatus of claim 15 further comprising selector means for selectively coupling to said low pass filter means the down-sampled digital color difference signal $D_Q$ when said low pass filter means operates in accordance with said first television standard or the down-sampled digital color difference signal $D_U$ when said low pass filter means operates in accordance with said second television standard.

17. The apparatus of claim 15 wherein said third matrix is operable to produce additional color difference signals $D_I$ from said digital red and blue color difference components in accordance with said first television standard and additional color difference signals $D_V$ from said digital red and blue color difference components in accordance with said second television standard; and further comprising second digital low pass filtering means coupled to said third matrix to limit the frequency band of the additional color difference signals $D_I$, $D_V$ produced by said third matrix by providing a predetermined first attenuation at a first frequency of the additional color difference signal $D_I$ and a predetermined second attenuation at a second frequency of the additional color difference signal $D_V$, the band-limited additional color difference signal $D_I$, $D_V$ being coupled to said modulating means.

18. The apparatus of claim 17, further comprising additional selector means for selectively coupling to said modulating means the additional color difference signal $D_I$ when the first-mentioned digital low pas filtering means operates in accordance with said first television standard and the additional color difference signal $D_V$ when said first-mentioned digital low pass filtering means operates in accordance with said second television standard.

19. The apparatus of claim 15, further comprising level setting means coupled to receive the digital red and blue color difference components for establishing predetermined quantizing values to represent respective reference levels of the digital red and blue color difference components for said digital component or digital composite video signals produced in accordance with said first or said second television standard.

20. The apparatus of claim 19 further comprising combining means for combining said digital primary color image signals to produce a digital luminance signal for said digital component and digital composite video signals.

21. A common encoder for a color television camera operable in accordance with first or second television standards to encode digital primary color image signals at a sampling clock rate into digital component or digital composite video signals, said encoder comprising luminance signal generating means for combining the digital primary color image signals to generate a luminance signal therefrom; level setting means for establishing predetermined quantizing values for said luminance signal to represent respective reference levels of the digital component and digital composite video signals when the color television camera operates in accordance with said first or second television standard; matrix means for combining the luminance signal and at least predetermined ones of said digital primary color image signals to produce color difference components at aid sampling clock rate; first color difference signal means coupled to receive and selectively produce from the color difference components digital color difference signals in accordance with said first or second television standard; first downsampling means for providing the digital color difference signals with a clock rate reduced from said sampling clock rate; first low pass filter mean for frequency band limiting selected ones of the reduced clock rate first color difference signals in said first and second television standards; second color difference signal means for combining the digital primary color image signals to generate a predetermined digital color difference signal in accordance with said first television standard; second downsampling means for downsampling the predetermined digital color difference signal to a clock rate less than said sampling clock rate; second low pass filter means for frequency band limiting either the down-sampled predetermined digital color difference signal or one of the digital color difference signals of reduced clock rate produced in accordance with said second television standard; and modulating means for modulating a subcarrier with the band limited color difference signals provided by said first and second low pass filter means for use in said digital composite video signal.

22. The encoder of claim 21 further comprising second level setting means for establishing quantizing levels of said color difference components produced by said matrix means.

23. The encoder of claim 22 wherein the predetermined quantizing values for said luminance signal represent 0% and 100%; and wherein the quantizing levels of said color difference components represent 0%, +100% and −100%.

24. The encoder of claim 23 wherein the predetermined quantizing values for said luminance signal further represent a sync tip level.

25. The encoder of claim 21 wherein said color difference components and said luminance signal comprise the digital component video signal.

26. The encoder of claim 25 wherein said first color difference signal means comprises second matrix means, and said first downsampling means is connected to the first-mentioned matrix means for supplying down-sampled color difference components to said second matrix means.

27. The encoder of claim 26 wherein said second matrix means produces digital I color difference signals in accordance with said first television standard and digital U and V color difference signals in accordance with said second television standard; and wherein said first low pass filter means is connected to receive said digital I or said digital V color difference signals when the color television camera operates in accordance with said first or second television standard, respectively.

28. The encoder of claim 27 wherein said second color difference signal means comprises third matrix means for producing digital Q color difference signals; and wherein said second low pass filter means is connected to receive said digital Q or said digital U color difference signals when said color television camera operates in accordance with said first or second television standard, respectively.

29. The encoder of claim 28 wherein said second downsampling means downsamples the clock rate of said digital Q color difference signal from $2f_s$ to $f_s/2$.

* * * * *